(No Model.)

H. J. MACKLIN.
FASTENING WHEELS OR PULLEYS UPON SHAFTS.

No. 362,167. Patented May 3, 1887.

Witnesses.
C. F. Budenberg,
Frederick John Bingham

Inventor.
Harry Johnson Macklin
per William Lloyd Wise
Attorney.

UNITED STATES PATENT OFFICE.

HARRY JOHNSON MACKLIN, OF ULVERSTONE, COUNTY OF LANCASTER, ENGLAND.

FASTENING WHEELS OR PULLEYS UPON SHAFTS.

SPECIFICATION forming part of Letters Patent No. 362,167, dated May 3, 1887.

Application filed February 3, 1886. Serial No. 190,694. (No model.) Patented in England September 26, 1885, No. 11,488.

*To all whom it may concern:*

Be it known that I, HARRY JOHNSON MACKLIN, a subject of the Queen of Great Britain and Ireland, residing at Ulverstone, in the county of Lancaster, Kingdom of Great Britain and Ireland, have invented new and useful Improvements in the Fastening of Wheels or Pulleys upon Axles or Shafts, of which the following is a specification.

My invention relates to a mode of fastening wheels or pulleys securely upon axles or shafts in such manner that they can be readily removed and replaced when required—as, for example, in the event of breakage or wear. For this purpose the nave or boss of the wheel or pulley is made with a transverse hole or holes, contracted or reduced in diameter or closed at or near one end thereof, and the longitudinal hole for the reception of the axle or shaft is formed with a keyway. A pin or pins traversing the axle or shaft and entering at one end the hole or recess or holes or recesses in the wheel nave or boss is or are used in conjunction with a key arranged longitudinally of the nave or boss in such a way that it serves to lock the pin or pins in place.

In the accompanying sheet of drawings two examples are shown by way of illustration.

Figure 1:
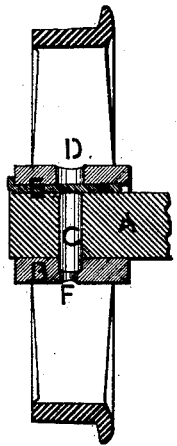
Figure 2:
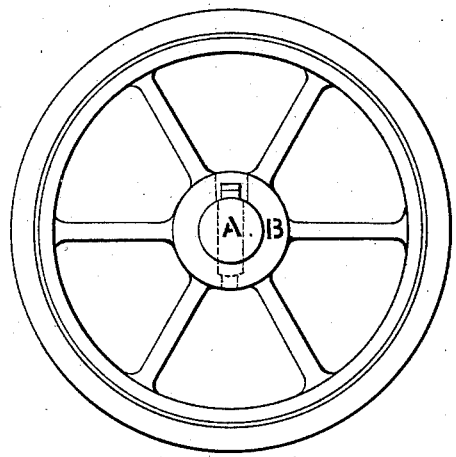
Figure 3:
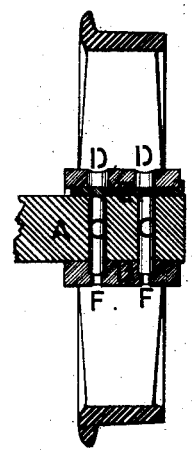
Figure 4:
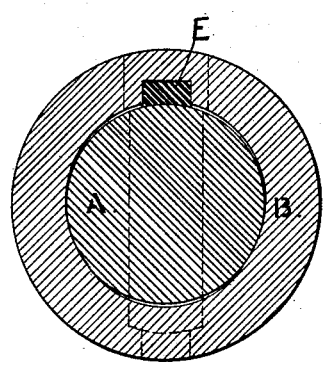
Figure 5:
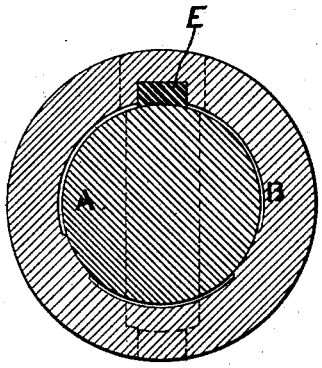

Figure 1 is a face view of a flanged wheel. Fig. 2 is a central transverse section showing the arrangement for fastening to a shaft when only one pin is used. Fig. 3 is a like view illustrating the application of two pins. Fig. 4 is a section drawn to a larger scale at right angles to Figs. 2 or 3, showing the boss, shaft, and key. Fig. 5 is a similar view of a modification.

Referring to Fig. 2, A is an axle or shaft having a transverse hole through it. B is a wheel-boss, also having a hole through it transversely. This hole is smaller at the end F than at D, or it may be closed or partly closed at or near the one end, or be of tapering form, the narrower end being at F. C is a pin introduced (after placing the wheel on the axle or shaft with the holes in line) through D and through the hole in the axle or shaft. E is a key that intercepts the line of holes. The key is driven in from either side of the wheel, but preferably from that side at which the axle bearing nearest the wheel is situated—that is to say, the key is driven in from the inner side of the wheel for inside bearings and from the outer side for outside bearings. This admits of the key being clinched or split or otherwise secured at the outer side to prevent its working back without fear of catching against the bearing or pedestal.

The arrangement illustrated in Fig. 3 differs only in the use of two pins with corresponding holes in lieu of one.

Although the drawings illustrate the invention as applied to flanged wheels, it will be evident pulleys and other wheels or couplings may be similarly fastened to shafts or axles. As will be evident, the pin or pins traversing the axle or shaft and entering the nave or boss of the wheel or pulley will effectually prevent its leaving the axle or shaft, while the pin or pins is or are in turn securely locked in place by the key.

To prevent the sidewise movement to which wheels are liable when secured with a single key on a shaft or axle which they do not accurately fit, the hole through the wheel boss or nave may be formed approximately oval or egg-shaped, as shown in transverse section in Fig. 4, or be provided with projections, as shown in Fig. 5. By either of these arrangements the shaft or axle, instead of taking a bearing in the boss or nave at a position directly opposite to the securing-key, will take two side bearings relatively to the key, as shown, and sidewise movement of the wheel will be prevented. The hole through the boss or nave, instead of being formed as shown, may be of other form, provided a clearance be left between the axle and that part of the boss or nave opposite the key.

What I claim is—

1. As means for fastening a wheel or pulley upon an axle or a shaft, a transverse pin or pins extending through the shaft and at one end into the nave or boss of the wheel or pulley, in combination with a key at the other end or ends of said pin or pins, serving to lock said pin or pins in place, substantially in the manner hereinabove described.

2. A nave or boss having a transverse pin hole or holes contracted or reduced in diameter at or near one end thereof, a longitudinal hole for the axle or shaft so formed as to bear against only parts of the circumference of same, and a keyway to receive a key to lock in place the fastening pin or pins and take a bearing against the axle or shaft, as described.

HARRY JOHNSON MACKLIN.

Witnesses:
WILLIAM HENRY HOLDEN,
    4 *Hood Terrace, Ulverstone, Lanc's.*
GEORGE HENRY BOOTH.
    7 *Lightburn Avenue, Ulverstone, Lanc's.*